United States Patent
Oyama et al.

(10) Patent No.: US 6,798,643 B2
(45) Date of Patent: Sep. 28, 2004

(54) METAL COLLECTOR FOIL FOR ELECTRIC DOUBLE LAYER CAPACITOR, METHOD OF PRODUCING THE METAL COLLECTOR FOIL, AND ELECTRIC DOUBLE LAYER CAPACITOR USING THE METAL COLLECTOR FOIL

(75) Inventors: Shigeki Oyama, Saitama (JP); Manabu Iwaida, Saitama (JP); Kenichi Murakami, Saitama (JP); Hiroto Kobayashi, Saitama (JP); Koichi Yoshida, Tokyo (JP); Hiroyuki Saito, Tokyo (JP); Kouki Ozaki, Aichi (JP); Masanori Tsutsui, Aichi (JP)

(73) Assignees: Honda Motor Co., Ltd., Tokyo (JP); Nippon Chemi-Con Corporation, Tokyo (JP); Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/721,748

(22) Filed: Nov. 26, 2003

(65) Prior Publication Data
US 2004/0130853 A1 Jul. 8, 2004

(30) Foreign Application Priority Data
Nov. 29, 2002 (JP) ........................................ 2002-348947
Oct. 1, 2003 (JP) ........................................ 2003-343830

(51) Int. Cl.[7] ................................................. H01G 9/00
(52) U.S. Cl. ........................ 361/502; 361/503; 361/504; 361/508; 361/511; 361/512
(58) Field of Search ................................ 361/502, 503, 361/504, 508, 509, 510, 511, 512, 523, 525, 528, 529, 530, 516

(56) References Cited

U.S. PATENT DOCUMENTS

| | | | | |
|---|---|---|---|---|
| 6,072,693 A | * | 6/2000 | Tsushima et al. | 361/502 |
| 6,195,251 B1 | * | 2/2001 | Suhara et al. | 361/502 |
| 6,587,329 B1 | * | 7/2003 | Feger | 361/504 |
| 6,631,074 B2 | * | 10/2003 | Bendale et al. | 361/509 |
| 6,643,119 B2 | * | 11/2003 | Nanjundiah et al. | 361/502 |
| 6,721,168 B2 | * | 4/2004 | Takeuchi et al. | 361/502 |

FOREIGN PATENT DOCUMENTS

JP 11283871 A 10/1999

* cited by examiner

Primary Examiner—Dean A. Reichard
Assistant Examiner—Nguyen T. Ha
(74) Attorney, Agent, or Firm—Arent Fox PLLC

(57) ABSTRACT

A metal collector foil for an electric double layer capacitor has etched upper and lower surface layers and an unetched central layer disposed between the etched upper and lower surface layers. The etched upper and lower surface layers have a total thickness sufficient to provide the metal collector foil with a capacitance per unit area that corresponds to a capacitance value obtained when the etched metal collector foil is subjected to an anodic formation process with application of a withstanding voltage of 65.6 volts, the capacitance value being not less than 1.7 $\mu F/cm^2$. The unetched central layer has a thickness sufficient to provide the metal collector foil with a tensile strength not less than 9,000 $N/cm^2$. A method of producing the metal collector foil and an electric double layer capacitor incorporating therein the metal collector foil are also disclosed.

6 Claims, 6 Drawing Sheets

METAL COLLECTOR FOIL FOR ELECTRIC DOUBLE LAYER CAPACITOR, METHOD OF PRODUCING THE METAL COLLECTOR FOIL, AND ELECTRIC DOUBLE LAYER CAPACITOR USING THE METAL COLLECTOR FOIL

FIELD OF THE INVENTION

The present invention relates to a metal collector foil for use in an electric double layer capacitor, a method of producing the metal collector foil, and an electric double layer capacitor using the metal collector foil.

BACKGROUND OF THE INVENTION

Electric double layer capacitors are known heretofore. Japanese Patent Laid-open Publication (JP-A1) No. 11-283871 discloses an invention that focuses in particular on the strength of a metal collector foil for such electric double layer capacitors. The metal collector foil is made of aluminum and has a roughened surface layer of 1 to 5 $\mu$m thick. It is stated in this publication that as for roughened surface layers having thicknesses greater than 5 $\mu$m, no further improvement in the bonding strength is achieved; The larger the thickness of the roughened surface layer, the smaller the strength of the aluminum foil; Especially, a 2–4 $\mu$m thick roughened surface is preferable.

Based on the disclosure of JP-A1-11-283871, many sample electric double layer capacitors were produced by the present inventors for evaluation. The produced samples indicated that the metal collector foil was satisfactory in terms of strength, but due to an insufficient bonding strength relative to a sheet-like electrode material, electrode separation did occur during operation of the electric double layer capacitors, which significantly lowered the electricity storage capability of the capacitor. In this regard, it may be considered that the metal collector foil of the afore-said Japanese publication was designed mainly for keeping a desired mechanical strength, and for that reason, formation of an etched rough surface layer to increase the bonding strength was insufficiently addressed.

SUMMARY OF THE INVENTION

It is accordingly an object of the present invention to provide a metal collector foil for use in an electric double layer capacitor, which is capable of providing a sufficient bonding strength relative to an electrode material while keeping a desired mechanical strength.

Another object of the present invention is to provide a method of producing such metal collector foil.

A further object of the present invention is to provide an electric double layer capacitor using the same metal collector foil.

According to a first aspect of the present invention, there is provided a metal collector foil for an electric double layer capacitor, which comprises an etched metal collector foil having etched upper and lower surface layers and an unetched central layer disposed between the etched upper and lower surface layers. The etched upper and lower surface layers have a total thickness sufficient to provide the metal collector foil with a capacitance per unit area that corresponds to a capacitance value obtained when the etched metal collector foil is subjected to an anodic formation process with application of a withstanding voltage of 65.5 volts, the capacitance value being not less than 1.7 $\mu$F/cm$^2$. The unetched central layer has a thickness sufficient to provide the metal collector foil with a tensile strength not less than 9,000 N/cm$^2$.

Since the unetched central layer has a thickness sufficient to provide the metal collector foil with a tensile strength not less than 9,000 N/cm$^2$, it is possible to prevent the metal collector foil from being broken or ruptured during the winding process. Additionally, since the etched upper and lower surface layers have a total thickness sufficient to provide the metal collector foil with a capacitance per unit area that corresponds to a capacitance value obtained when the etched metal collector foil is subjected to an anodic formation process with application of a withstanding voltage of 65.5 volts, and since the capacitance value is not less than 1.7 $\mu$F/cm$^2$, a sufficiently high bonding strength can be provided between the metal collector foil and the electrode material. This ensures that an electric double layer capacitor in which the metal collector foil is used can operate stably and reliably without causing accidental electrode separation.

The metal collector foil may comprise an aluminum foil having a purity of at least 99.8% and an overall thickness of approximately 39 $\mu$m, in which instance the total thickness of the etched upper and lower surface layers is in a range of 22 to 30 $\mu$m, and the thickness of the unetched central layer is in a range of 9 to 17 $\mu$m.

According to a second aspect of the invention, there is provided a method of producing a metal collector foil for use in an electric double layer capacitor, which comprises the steps of: preparing a plain metal foil; and etching the metal foil in a chloride solution to dissolve the surface of the metal foil until etched upper and lower surface layers of the metal foil have a total thickness sufficient to provide the metal foil with a capacitance per unit area that corresponds to a capacitance value obtained when the etched metal collector foil is subjected to an anodic formation process with application of a withstanding voltage of 65.5 volts, the capacitance value being not less than 1.7 $\mu$F/cm$^2$, and an unetched central layer of the metal foil has a thickness sufficient to provide the metal foil with a tensile strength not less than 9,000 N/cm$^2$.

In one preferred form of the invention, the metal collector foil comprises an aluminum foil having a purity of at least 99.8% and an overall thickness of approximately 39 $\mu$m. In this case, the etching is carried out to the extent that the total thickness of the etched upper and lower surface layers is in a range of 22 to 30 $\mu$m, and the thickness of the unetched central layer is in a range of 9 to 17 $\mu$m.

According to a third aspect of the present invention, there is provided an electric double layer capacitor comprising a positive electrode and a negative electrode each having a metal collector foil and an electrode material formed mainly from activated carbon and bonded to both opposite surfaces of the metal foil, a dielectric separator disposed between the positive and negative electrodes, and a liquid electrolyte impregnated in the electrode material to enable charging and discharging of the electric double layer capacitor. The metal collector foil has etched upper and lower surface layers and an unetched central layer disposed between the etched upper and lower surface layers. The etched upper and lower surface layers have a total thickness sufficient to provide the metal collector foil with a capacitance per unit area that corresponds to a capacitance value obtained when the etched metal collector foil is subjected to an anodic formation process with application of a withstanding voltage of 65.5 volts, the capacitance value being not less than 1.71 $\mu$F/cm$^2$, and the unetched central layer has a thickness sufficient to provide the metal collector foil with a tensile strength not less than 9,000 N/cm².

BRIEF DESCRIPTION OF THE DRAWINGS

A preferred structural embodiment of the present invention will be described in detail herein below, by way of example only, with the reference to the accompanying drawings, in which.

DETAILED DESCRIPTION OF THE PREFERRED EMBODIMENT

Figure 1:
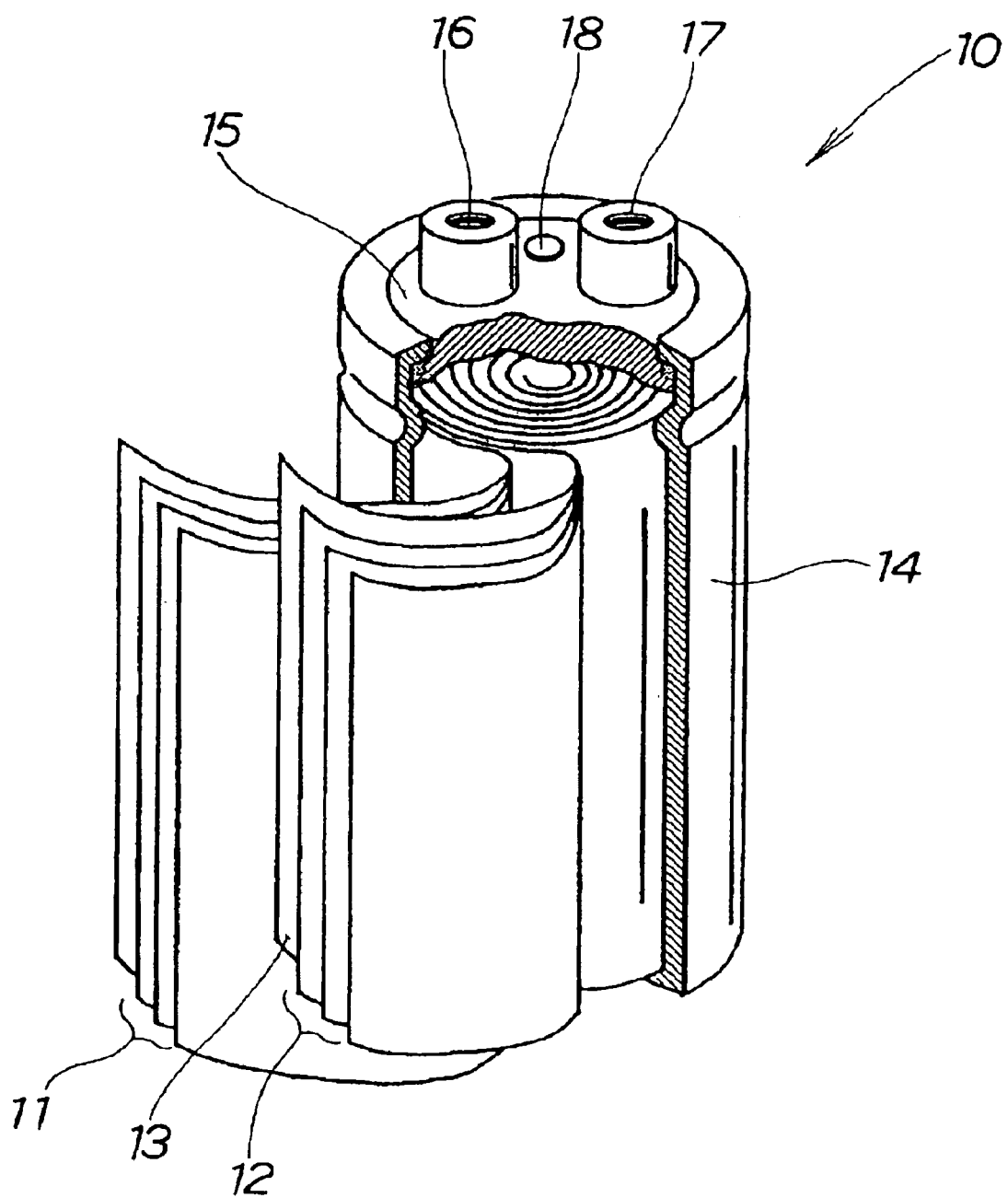
FIG. 1 is a perspective view, with parts cut away and with parts extended for clarity, of an electric double layer capacitor according to an embodiment of the present invention.

Referring now to the drawings and FIG. 1 in particular, there is shown an electric double layer capacitor 10 in which a metal collector foil according to the present invention is used. The electric double layer capacitor 10 includes an elongated strip of positive electrode or anode 11 and an elongated strip of negative electrode or cathode 12 that are laminated together with a separator 13 disposed therein. The laminated anode and cathode 11 and 12 are tightly wound into a roll and received in a cylindrical container 14. Numeral 15 denotes an end seal plate for sealing an open end of the container 14, 16 a positive tab or terminal connected to the anode 11, 17 a negative tab or terminal connected to the cathode 12, and 18 an inlet for filling an electrolyte into the container 14.

Figure 2:
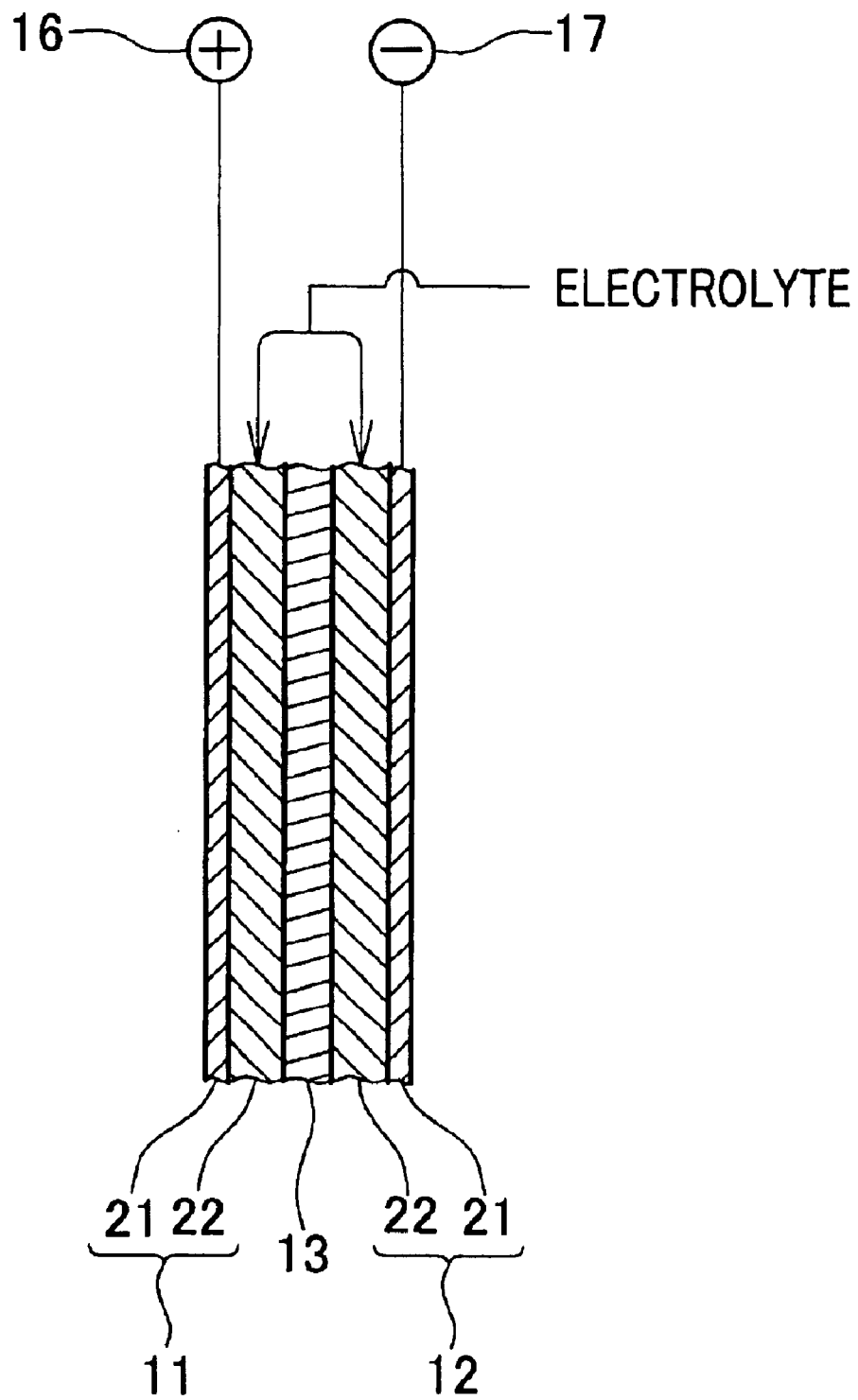
FIG. 2 is an enlarged cross-sectional view of a main portion of the electric double layer capacitor.

As diagrammatically shown on enlarged scale in FIG. 2, the anode 11 and the cathode 12 are each formed by a collector foil 21 made of metal such as aluminum, and an electrode material 22 formed mainly from activated carbon and bonded in the form of a sheet on both opposite surfaces of the metal collector foil 21. In FIG. 2, only one electrode material layer 22 for each of the anode 11 and the cathode 12 is shown for the purpose of illustration.

The electrode materials 22, 22 are impregnated with an adequate amount of electrolyte. When a DC voltage is applied across the positive and negative terminals 16 and 17, positive and negative ions electrostatically absorb to the interior of the electrode materials 22, 22 and to the surfaces of the metal collector foils 21, 21 so that they create a positive pole and a negative pole, respectively. Upon discharging, the absorbed ions shift to create motion or transfer of an electron so that an electric current can be taken out through the positive and negative terminals 16, 17.

Figure 3:
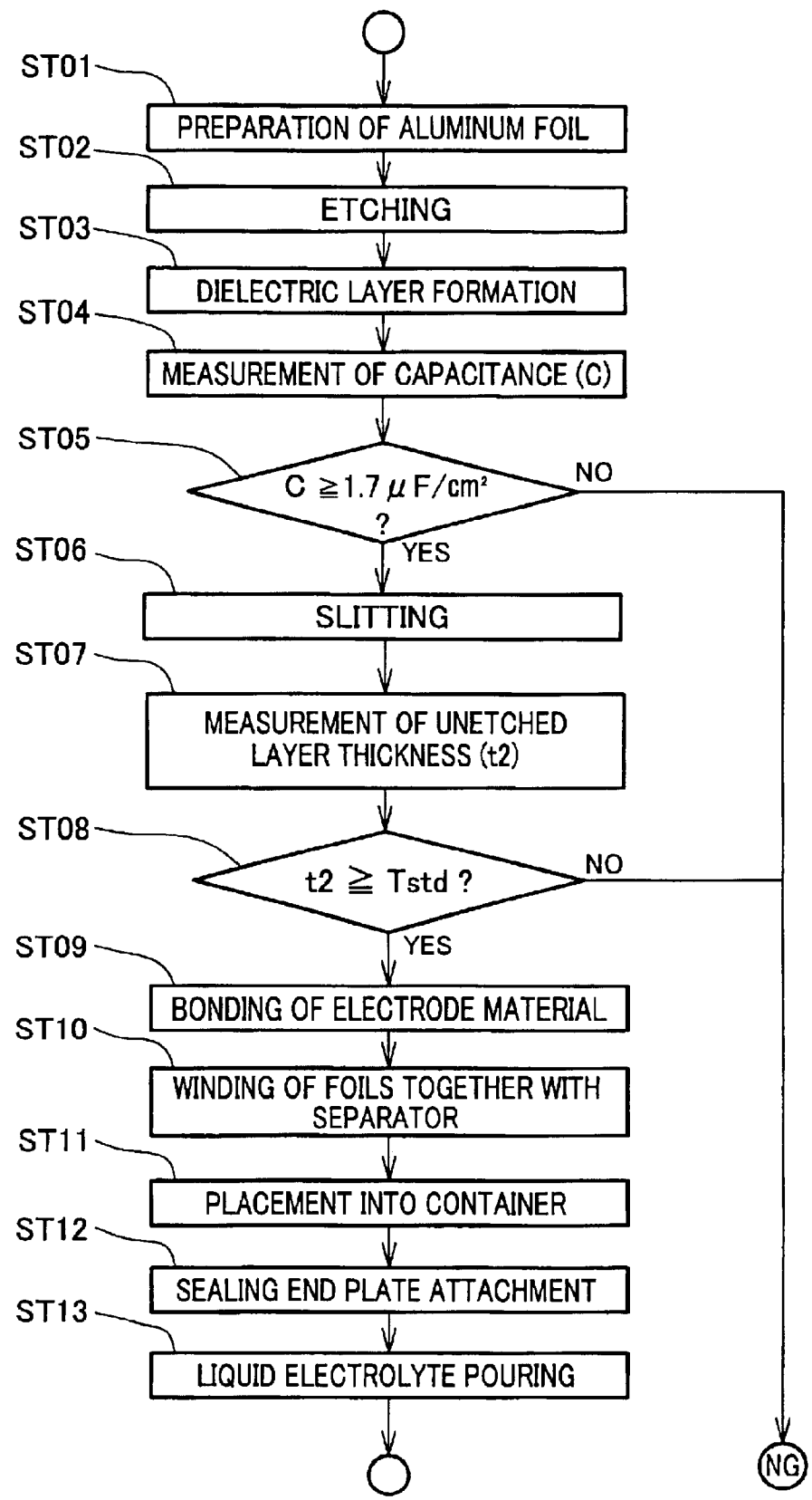
FIG. 3 is a flowchart showing a sequence of processing steps that are achieved to carry out a method of the present invention to produce the electric double layer capacitor shown in FIG. 1.

FIG. 3 is a flowchart showing a sequence of processing steps achieved to produce the electric double layer capacitor 10 of the present invention. As shown in this figure, a step ST01 prepares a metal collector foil, which is formed from, for example, a plain aluminum foil having a purity of at least 99.8%. The plain aluminum foil has a flat and smooth surface because it has not been surface-treated by an etching process or an anodic formation process.

The aluminum foil is then etched in an etching solution containing hydrochloric acid to preferentially dissolve the surface of the aluminum foil. With this etching process, a roughed surface layer having fine pits is formed on the aluminum foil. The fine pits in the roughened surface serve to anchor an electrode material when the electrode material is later bonded to the aluminum foil. The etched aluminum foil is subjected to a neutralizing process for cleaning itself to a predetermined degree or extent that the residual chlorine concentration of the cleaned foil meets a control criterion (not greater than 1.0 mg/m²). Excessive cleaning of the etched foil can thus be avoided.

Then, a step ST03 performs an anodic formation process as a pretreatment process that is achieved prior to the capacitance measurement. In the anodic formation process, a foil strip cut off from the etched aluminum foil is immersed in an aqueous solution (forming bath) including ammonium adipic acid and applied with a DC voltage (dielectric withstanding voltage) etched volts so that the etched foil strip becomes positive and the solution becomes negative. Then an aluminum oxide film formed on the surface of the etched foil strip in proportion to the applied voltage.

Figure 4:
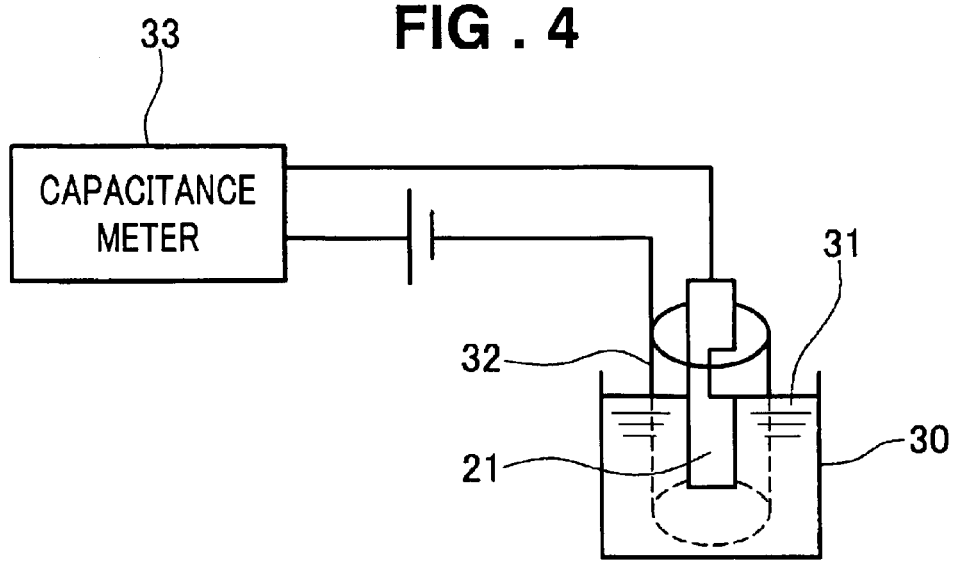
FIG. 4 is a diagrammatical view showing the principle of capacitance measurement of an etched metal collector foil that is used in the production of the electric double layer capacitor.

A step ST04 undertakes measurement of the capacitance of the etched aluminum foil. FIG. 4 diagrammatically shows a principle of capacitance measurement used in ST04, where an etched and formed foil strip 21 and an opposite electrode 32 disposed to surround the foil strip 21 are immersed in an aqueous solution 31 including ammonium adipic acid in a test container 30 and applied with a DC voltage with a capacitance meter 33 disposed across the foil strip 21 and the electrode 32. By using the arrangement shown in FIG. 4, a capacitance value (C) of the etched and formed foil strip 21 itself can be measured by the capacitance meter 33.

Then, a step ST05 shown in FIG. 3 determines whether or not the measured capacitance (C) of the foil strip 21 is greater than or equal to 1.7 $\mu$F/cm². When the result of determination is affirmative (i.e., C≧1.7 $\mu$F/cm²), a step ST06 is then performed to slit the etched aluminum foil into various widths depending on the specific size of a capacitor to be produced. Alternatively when the determination result is negative (i.e., C<1.7, $\mu$F/cm²), the etched aluminum foil is judged as a defective foil.

Figure 5:
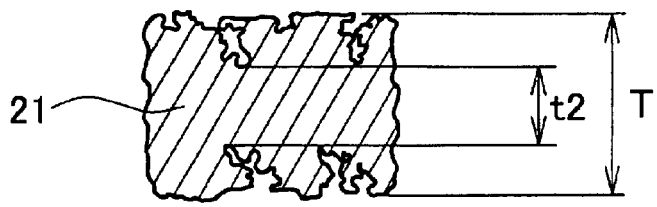
FIG. 5 is a cross-sectional view of the etched metal collector foil.

The step ST06 is followed by a step ST07, which measures the thickness of an unetched layer of the slit aluminum foil while observing the cross section of the slit aluminum foil. As shown in FIG. 5, the etched aluminum foil 21 has etched upper and lower surface layers and an unetched central layer disposed between the upper and lower surface layers. Given that the etched aluminum foil 21 has a thickness T, and the unetched central layer has a thickness t2 has an overall thickness T and unetched central layer has a thickness t2, a total thickness t1 of the etched upper and lower surface layers (hereinafter referred to a "total etched layer thickness") can be obtained by an equation t1=T−t2.

For a subsequent step ST08, a thickness Tstd of the unetched central layer, which corresponds to a tensile strength of 9,000 N/cm2, is determined in advance. To this end, apart from the slitting process achieved at the step ST06, a generally rectangular test piece of given size (10 mm in width and 50 mm in length plus opposite end margins for gripping) is cut out from the etched foil. The test piece is tested for the tensile strength using a tensile strength tester under the provisions as specified by the Japanese Industrial Standards (JIS) B 7721.

Figure 6:
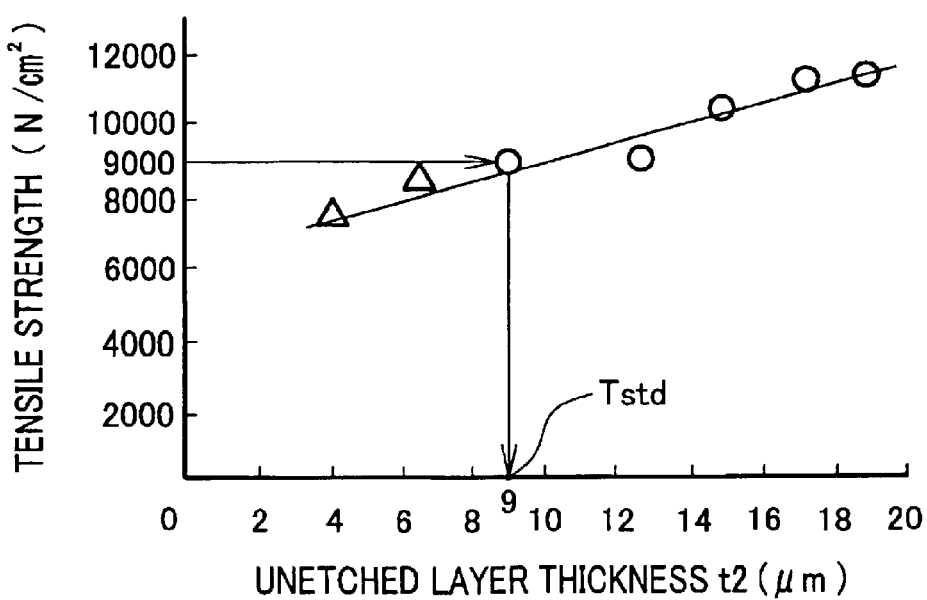
FIG. 6 is a graph showing the relationship between the tensile strength and the unetched layer thickness in a certain etched aluminum foil.

FIG. 6 is a graph showing the relationship between the thickness of unetched layer and the tensile strength that is taken with respect to a certain foil on the basis of measured values or data described later on. The manufacture of an electric double layer capacitor includes a process of winding foil strips into a cylindrical element. During the winding process, the foil strips may be broken or ruptured due to a tensile force applied thereto. To avoid this, it is effective for the aluminum foil to increase the tensile strength to at least 9,000 N/cm$^2$. Consequently, by first drawing a line horizontally from the value 9,000 N/cm$^2$ on the y-axis of FIG. 6, and then drawing a line vertically downward from the intersection between the horizontal line and the line in FIG. 6, we can obtain a value 9 μm on the x-axis as a thickness Tstd of the unetched layer of the aluminum foil which corresponds to the tensile strength 9,000 N/cm$^2$.

In the illustrated embodiment, Tstd=9 μm. However, when components of the aluminum foil are changed, when etching conditions are altered or when a foil formed from a metal other than aluminum is used, the graph shown in FIG. 6 is renewed to determine a Tstd value which is best suited for given conditions.

Then, at a step ST08 shown in FIG. 3, it is determined whether or not the measured thickness t2 of the unetched layer is greater than or equal to Tstd (here 9 μm). When the result of determination is affirmative (i.e., t2≧Tstd), a step ST09 is carried out to attach a sheet-like electrode material by, for example, adhesion bonding to the etched aluminum foil. Alternatively when the determination result is negative (i.e., t2<Tstd), the etched aluminum foil is judged as a defective foil.

The step ST09 is followed by a step ST10 where two foils with electrode materials carried thereon are wound into a cylindrical element together with a separator. The cylindrical element is then received in a cylindrical container at a step ST11 and after that an open end of the cylindrical container is hermetically closed by a sealing end plate at a step ST12. Subsequently, at a step ST13, a liquid electrolyte is filled in the container to impregnate the electrode materials. An electric double layer capacitor, such as one shown in FIG. 1, is thus obtained. Among the foregoing processing steps ST01–ST13, these steps ST03 to ST08 may be achieved on a sampling basis and carried out off-line. The order or sequence of ST03–ST08 may be altered.

For a more complete understanding, the invention will now be described in greater detail with reference to the following examples.

EXAMPLES

For comparative purposes, seven samples were prepared under the conditions given below.
1. Materials
1-1. Metal Collector Foil
A plain aluminum foil was etched at 45° C. in a 5% hydrochloric acid solution with an AC current applied at 50 Hz with an electrolytic current density of 0.25 A/cm$^2$ while changing the quantity of electricity within a range of 30 to 45 A·min/dm$^2$ depending on Samples, as shown in Table 1 below.

TABLE 1

| Example | Quantity of Electricity (A · min/dm$^2$) |
| --- | --- |
| Example 1 | 30 |
| Example 2 | 32 |
| Example 3 | 34 |
| Example 4 | 36 |
| Example 5 | 38 |
| Comparative Example 1 | 43 |
| Comparative Example 2 | 45 |

The etched aluminum foil was washed at 50° C. in a pH1 aqueous acid bath for one minute and subsequently dried with hot air heated at 180° C.
1-2. Electrode Material
90 parts by weight of activated carbon, 5 parts by weight of graphite powder and 5 parts by weight of polytetrafluoroethylene (PTFE) were mixed together, kneaded and formed by rolling into a sheet-like electrode material having a thickness of 145 μm, a width of 100 mm and a length of 1,200 mm.
1-3. Adhesive
A conductive adhesive composed of polyvinyl alcohol (PVA), graphite and amorphous carbon.
1-4. Separator
A porous film of artificial silk having a thickness of 75 μm and a width of 105 mm.
1-5. Container
A cylindrical container having a diameter of 40 mm and a height of 130 mm.
1-6. Electrolyte
A liquid organic electrolyte consisting of toriethylmonomethylammonium polytetrafluoroborate/propylene carbonate (TEMA.BF4/PC).
2. Preparation of Samples
For each of the seven samples, the sheet-like electric material was bonding with the adhesion to both opposite surfaces of the etched aluminum foil. Two such aluminum foils were wound into a cylindrical element together with the separator. The cylindrical element was sealed inside the container and the liquid electrolyte was filled in the container. An electric double layer capacitor was thus produced.
3. Measurement
3-1. Capacitance Measurement
According to the method as described above with reference to FIG. 4.
3-2. Tensile Strength Measurement
According to the method as described above.
3-3. Unetched Layer Thickness (t2) Measurement
According to the method as described above.
3-4. Overall Foil Thickness (T) Measurement
According to the method as described above.
3-5. Calculation of Total Etched Layer Thickness (t1)
According to the calculation method as described above.
3-6. Cell Resistivity Measurement
Using new or unused samples, a resistance value (Ω) was measured by means of an ohm meter connected across the positive and negative terminals 16, 17 (see FIG. 1) of each sample capacitor. The measured resistance value A (Ω) was multiplied by an area B (cm$^2$) of the anode and cathode collector foils thereby to obtain a cell resistivity (Ωcm$^2$). Thus, the resistivity (Ωcm$^2$)=the resistance value A (Ω)×the area B (cm$^2$) of anode and cathode collector foils. It is noted, however, that the cell resistivity thus obtained is a value when the electrode materials of 145 μm thick (see 3-1 above) are used.

3-7. Measurement of Resistivity Increase Rate after 2000 Hours Aging

After the measurement of cell resistivity, each sample capacitor was subjected to an aging process during which a DC voltage of 2.5V was continuously applied in a high temperature (45° C.) atmosphere for 2,000 hours. After the elapse of 2,000 hours, application of the DC voltage was terminated. Then, constant voltage discharge was started at room temperature with a current value kept at 30 A. The discharge continued until the voltage showed a drop from 2.5 V to 1.0 V. After the end of the discharge, a cell resistivity after 2,000 hours aging was obtained for each sample capacitor, in the same manner as described above in the preceding paragraph 3-6. The thus obtained cell resistivity after 2,000 hours aging was compared with the cell resistivity previously obtained so as to determine to what extent the cell resistivity increases after the 2,000 hours aging. The thus determined increase in the cell resistivity is indicated by percent and referred to as "cell resistivity increase rate after 2,000 hours aging".

Table 2 given below shows the quantity of electricity, capacitance, tensile strength, unetched layer thickness, overall foil thickness, total etched layer thickness, cell resistivity and cell resistivity increase rate after 2,000 hours aging that are taken with respect to each of the seven sample capacitors.

better the quality of the capacitor. The values obtained in Examples 1–5 are all less than 16.0% while the values obtained in Comparative Examples 1 and 2 exceed 16.0%. It is evident from FIG. 8 that an unetched layer thickness at least equal to 9 μm is sufficient to effectively suppress the resistivity increase rate after 2,000 hours aging.

Figure 9:
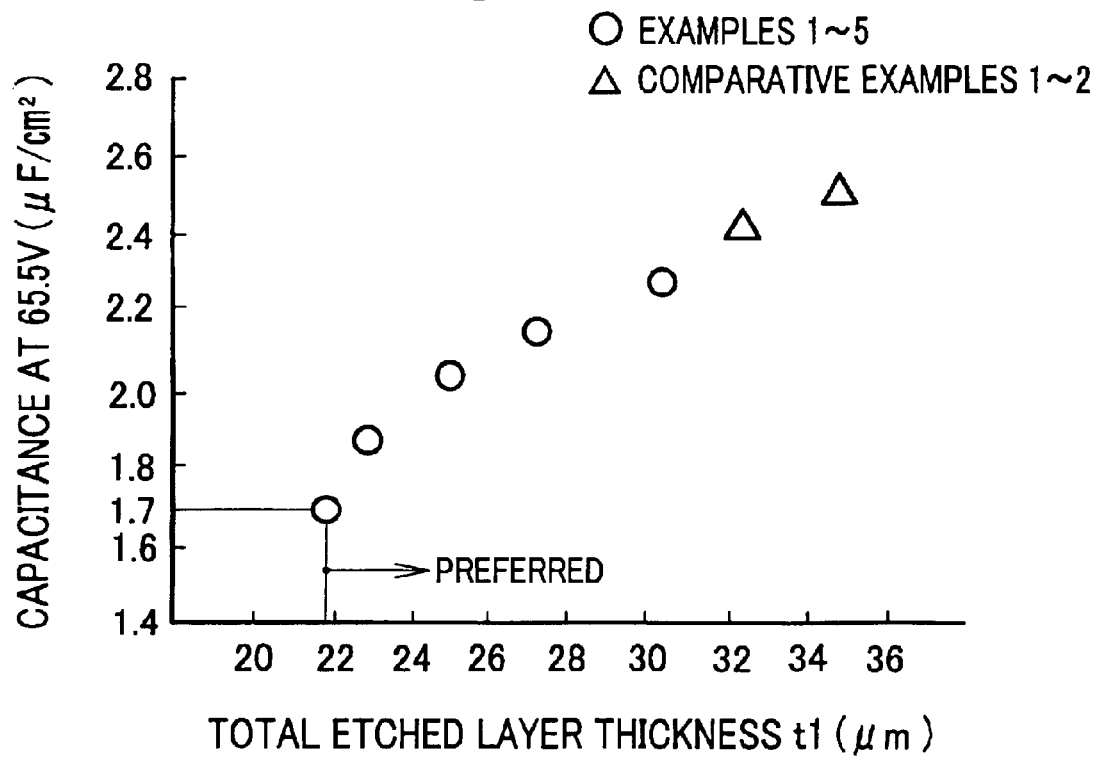
FIG. 9 is a graph showing the relationship between the capacitance and the total etched layer thickness.

FIG. 9 is a graph showing the relationship between the total etched layer thickness and the capacitance that is drawn using data shown in Table 2. The graph indicates values obtained in Examples 1–5 as circles and values obtained in Comparative Examples as triangles. Etching is a surface treatment process carried out to increase the capacitance of a foil. It appears clear from FIG. 9 that the capacitance increases with an increase in the total etched layer thickness, and a total etched layer thickness at least nearly equal to 22 μm can provide a necessary capacitance value (1.7 μF/cm$^2$).

Figure 10:
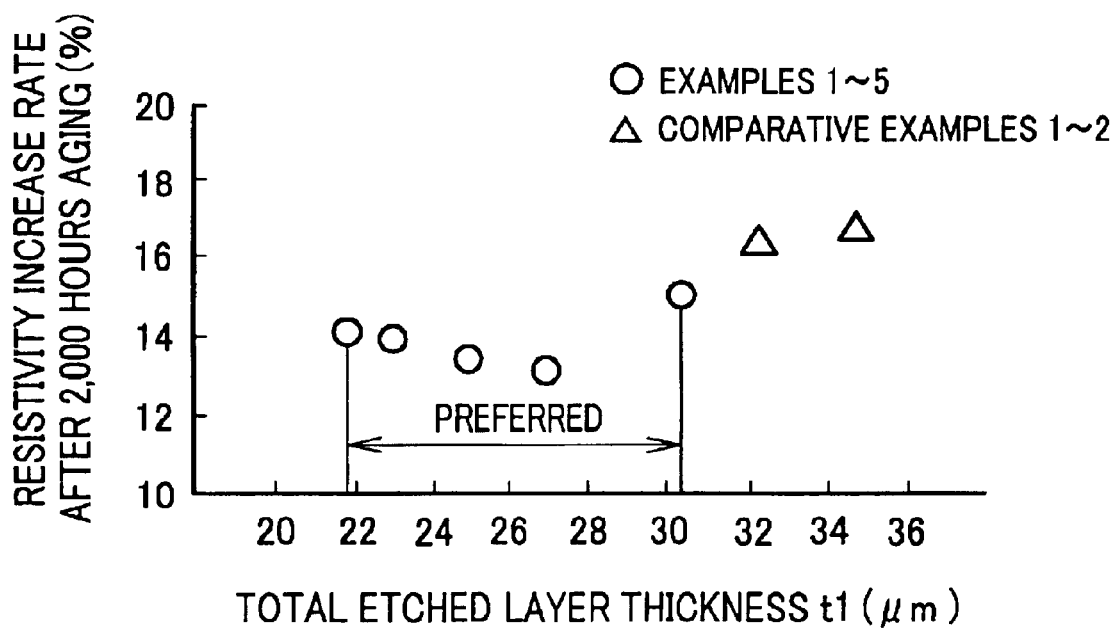
FIG. 10 is a graph showing the relationship between the resistivity increase rate after 2,000 hours aging and the total etched layer thickness.

FIG. 10 is a graph showing the relationship between the total etched layer thickness and the resistivity increase rate after 2,000 hours aging that is drawn using data shown in Table 2. The graph indicates values obtained in Examples 1–5 as circles and values obtained in Comparative Examples as triangles. For the same reason as discussed above, the resistivity increase rate after 2,000 hours aging is preferably as small as possible. As shown in FIG. 10, the resistivity increase rate after 2,000 hours aging indicates a sudden rise when the total etched layer thickness exceeds 30 μm. It is therefore preferable that the total etched layer thickness is in a range of about 22 to about 30 μm.

It can be obtained from the values shown in Table 2 that the total etched surface layer thicknesses T of the seven

TABLE 2

| | Example 1 | Example 2 | Example 3 | Example 4 | Example 5 | Comparative Example 1 | Comparative Example 2 |
|---|---|---|---|---|---|---|---|
| Etching Electricity (A · min/dm$^2$) | 30 | 32 | 34 | 36 | 38 | 43 | 45 |
| Capacitance at 65.5 V (μF/cm$^2$) | 1.69 | 1.87 | 2.04 | 2.15 | 2.28 | 2.41 | 2.54 |
| Tensile Strength (N/cm$^2$) | 11,360 | 11,050 | 10,350 | 9,830 | 9,030 | 8,560 | 7,830 |
| Unetched Layer Thickness (μm) | 18.5 | 17.3 | 14.9 | 12.6 | 8.7 | 6.5 | 4.0 |
| Overall Foil Thickness (μm) | 40.3 | 40.1 | 39.9 | 39.8 | 39.1 | 39.1 | 38.8 |
| Total Etched Layer Thickness (μm) | 21.8 | 22.8 | 25.0 | 27.2 | 30.4 | 32.6 | 34.8 |
| Cell Resistivity (Ω cm$^2$) | 3.29 | 3.26 | 3.29 | 3.32 | 3.49 | 3.82 | 4.30 |
| Cell Resistivity Increase Rate after 2,000 hr Aging (%) | 14.2 | 14.0 | 13.4 | 13.2 | 15.1 | 16.3 | 16.9 |

Figure 7:
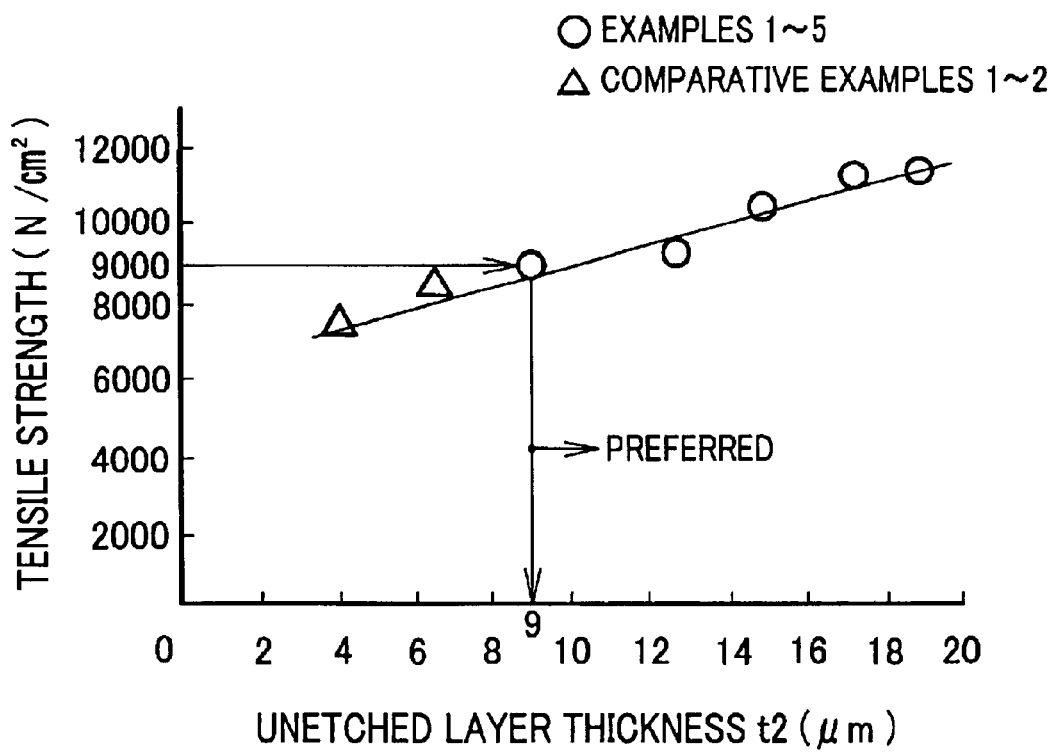
FIG. 7 is a graph showing the relationship between the tensile strength and the unetched layer thickness in a certain etched aluminum foil

FIG. 7 is a graph showing the relationship between the unetched layer thickness t2 and the tensile strength that is drawn using the data shown in Table 2. The graph indicates values obtained in Examples 1 to 5 as circles and values obtained in Comparative Examples 1 and 2 as triangles. As evidenced from FIG. 7, a tensile strength 9,000 N/cm$^2$ requires an unetched layer thickness at least equal to 9 μm. It may be stated in other words that an unetched layer having a thickness at least equal to 9 μm is sufficient to provide a necessary tensile strength (9,000 N/cm$^2$).

Figure 8:
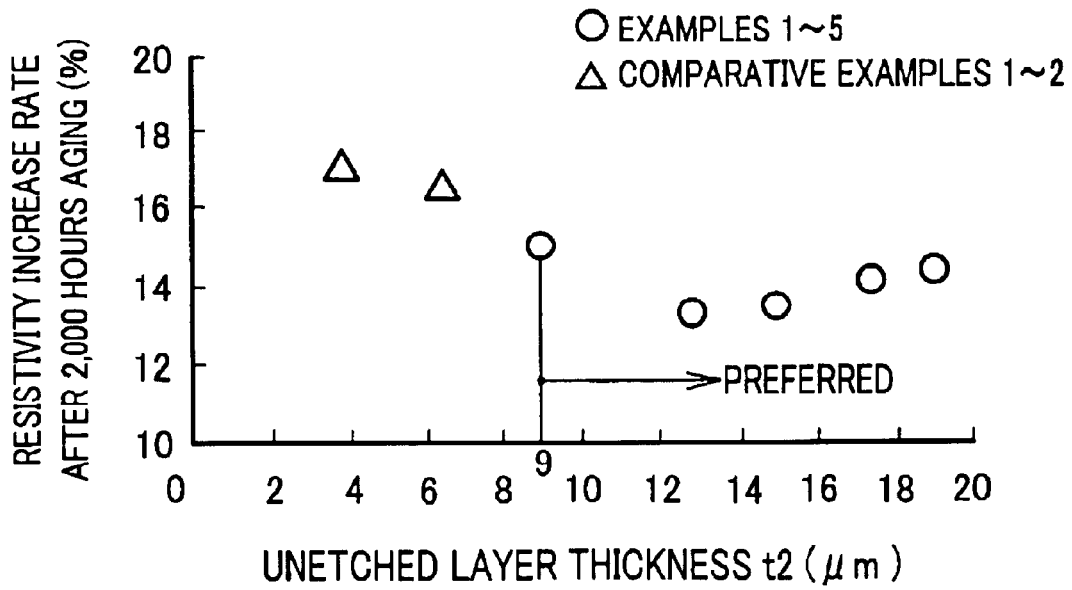
FIG. 8 is a graph showing the relationship between the resistivity increase rate after 2,000 hours aging and the unetched layer thickness.

FIG. 8 is a graph showing the unetched layer thickness and the resistivity increase rate after 2,000 hours aging that is drawn using the data shown in Table 2. The resistivity increase rate after 2,000 hours aging indicates a degree of degradation under aging phenomena and takes larger values as the degradation progresses. Accordingly, the smaller the values of resistivity increase rate after 2,000 hours aging the Samples have an average value of approximately 39 μm. From this it can be appreciated the capacitance per unit surface area of the foil itself is not less than 1.7 μF/cm$^2$ as long as the total etched layer thickness t1 is kept within a range of 22 to 30 μm, and that the tensile strength of the foil is not less than 9,000 N/cm$^2$ as long as the unetched layer thickness t2 is in a range of 9 to 17 μm.

In one preferred embodiment described above, the metal collector foils are formed from an aluminum foil. The material for the collector foil should by no means be limited to the aluminum but may include other metals than aluminum. Furthermore, the present invention can be effectively used in a cylindrical capacitor as in the illustrated embodiment as well as a flat plate-like capacitor so that the shape and configuration of the capacitor may be changed in option.

Obviously, various minor changes and modifications are possible in the light of the above teaching. It is to be understood that within the scope of the appended claims the present invention may be practiced otherwise than as specifically described.

What is claimed is:

1. A metal collector foil for an electric double layer capacitor, comprising:

an etched metal collector foil having etched upper and lower surface layers and an unetched central layer disposed between the etched upper and lower surface layers, wherein the etched upper and lower surface layers have a total thickness sufficient to provide the metal collector foil with a capacitance per unit area that corresponds to a capacitance value obtained when the etched metal collector foil is subjected to an anodic formation process with application of a withstanding voltage of 65.5 volts, the capacitance value being not less than 1.7 $\mu F/cm^2$, and the unetched central layer has a thickness sufficient to provide the metal collector foil with a tensile strength not less than 9,000 $N/cm^2$.

2. The metal collector foil according to claim 1, wherein the metal collector foil comprises an aluminum foil having a purity of at least 99.8% and an overall thickness of approximately 39 $\mu m$, the total thickness of the etched upper and lower surface layers is in a range of 22 to 30 $\mu m$, and the thickness of the unetched central layer is in a range of 9 to 17 $\mu m$.

3. A method of producing a metal collector foil for use in an electric double layer capacitor, comprising the steps of:

preparing a plain metal foil; and etching the metal foil in a chloride solution to dissolve the surface of the metal foil until etched upper and lower surface layers of the metal foil have a total thickness sufficient to provide the metal foil with a capacitance per unit area that corresponds to a capacitance value obtained when the etched metal collector foil is subjected to an anodic formation process with application of a withstanding voltage of 65.5 volts, the capacitance value being not less than 1.7 $\mu F/cm^2$, and an unetched central layer of the metal foil has a thickness sufficient to provide the metal foil with a tensile strength not less than 9,000 $N/cm^2$.

4. The method according to claim 3, wherein the metal collector foil comprises an aluminum foil having a purity of at least 99.8% and an overall thickness of approximately 39 $\mu m$, and the etching is carried out to the extent that the total thickness of the etched upper and lower surface layers is in a range of 22 to 30 $\mu m$, and the thickness of the unetched central layer is in a range of 9 to 17 $\mu m$.

5. An electric double layer capacitor comprising:

a positive electrode and a negative electrode each having a metal collector foil and an electrode material formed mainly from activated carbon and bonded to both opposite surfaces of the metal foil;

a dielectric separator disposed between the positive and negative electrodes; and a liquid electrolyte impregnated in the electrode material to enable charging and discharging of the electric double layer capacitor, wherein the metal collector foil has etched upper and lower surface layers and an unetched central layer disposed between the etched upper and lower surface layers, the etched upper and lower surface layers having a total thickness sufficient to provide the metal collector foil with a capacitance per unit area that corresponds to a capacitance value obtained when the etched metal collector foil is subjected to an anodic formation process with application of a withstanding voltage of 65.5 volts, the capacitance value being not less than 1.7 $\mu F/cm^2$, and the unetched central layer having a thickness sufficient to provide the metal collector foil with a tensile strength not less than 9,000 $N/cm^2$.

6. The electric double layer capacitor according to claim 5, wherein the metal collector foil comprises an aluminum foil having a purity of at least 99.8% and an overall thickness of approximately 39 $\mu m$, the total thickness of the etched upper and lower surface layers is in a range of 22 to 30 $\mu m$, and the thickness of the unetched central layer is in a range of 9 to 17 $\mu m$.

* * * * *